Figure 1:
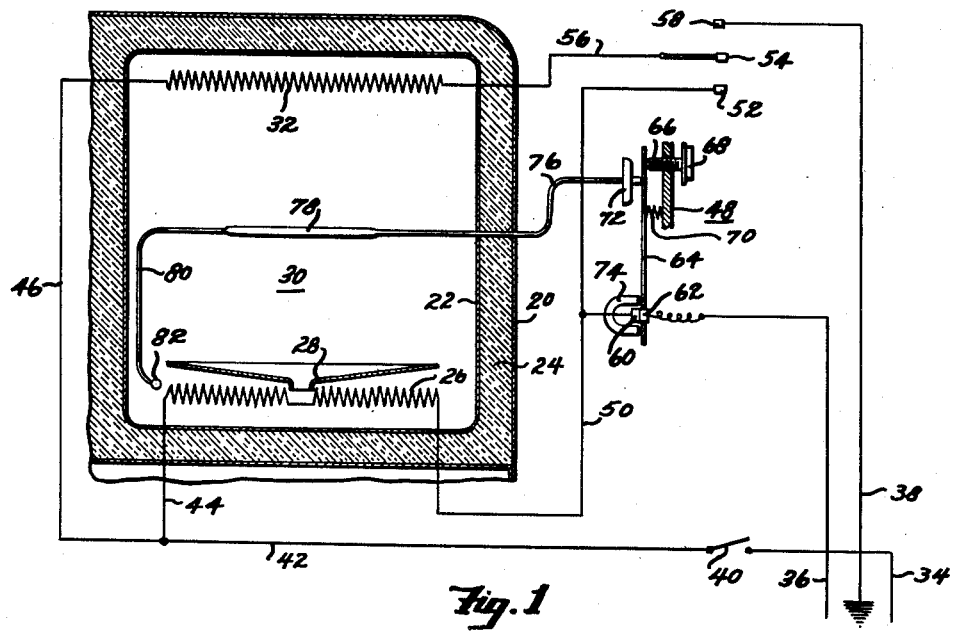

Feb. 17, 1942.  G. C. PEARCE  2,273,734
DOMESTIC APPLIANCE
Filed March 30, 1940

INVENTOR.
BY George C Pearce
Spencer Hardman and Fehr
ATTORNEYS

Patented Feb. 17, 1942

2,273,734

UNITED STATES PATENT OFFICE 2,273,734

DOMESTIC APPLIANCE

George C. Pearce, Dayton, Ohio, assignor to General Motors Corporation, Dayton, Ohio, a corporation of Delaware Application March 30, 1940, Serial No. 326,930

7 Claims. (Cl. 219—35)

This invention relates to a domestic appliance and more particularly to oven heating systems and oven controls.

Oven thermostats and particularly electric oven thermostats have difficult requirements. They must operate accurately over an extremely wide temperature range. This makes it difficult to provide an oven thermostat having a small differential where cycling is employed for control purposes. Differentials of 25° F. are common in electric oven thermostatic switches. With better design and more accurate workmanship it is possible to make an oven thermostatic switch with a differential of 10° F. Even this is difficult and increases the cost of the thermostat. For this reason, oven thermostats with such a low differential are comparatively rare. The problem is made more difficult because of the relatively heavy currents required to be carried by such switches. The reduction in the differential of the thermostat is very desirable in order to make oven temperatures more uniform. Further reduction of the differential of the oven thermostats is impractical because of the prohibitive cost.

It is an object of my invention to provide for an oven, a simple and inexpensive system for reducing temperature differential of the oven thermostat.

It is another object of my invention to provide for an oven an inexpensive oven control system having a smaller differential than is incorporated in the switch or mechanical control device employed as a part of the thermostatic control.

It is still another object of my invention to use the heating effect of a heating element to reduce the temperature differential of the oven thermostat.

Further objects and advantages of the present invention will be apparent from the following description, reference being had to the accompanying drawing, wherein a preferred form of the present invention is clearly shown.

Figure 2:
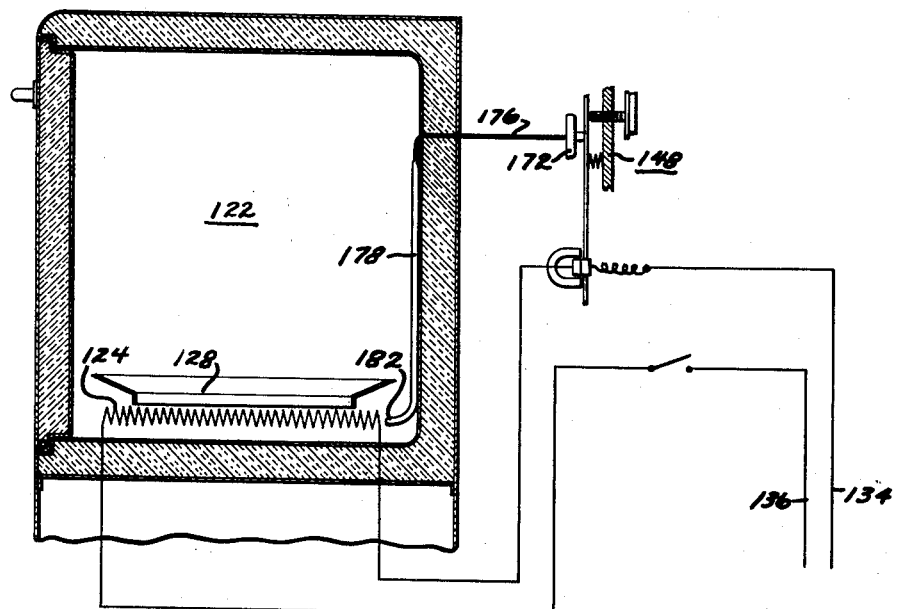

In the drawing:

Fig. 1 is a sectional view of a two-unit electric oven with one form of my improved control system; and Fig. 2 is a sectional view of a single unit electric oven with a modified form of my improved control system.

Briefly, I have shown an electric oven and an electric oven heating system controlled by the hydraulic thermostat which has a portion of its bulb system directly influenced by one of the electric heating elements in such a way as to reduce the temperature differential of the oven thermostat. While this is illustrated as applied to an electric oven, it may be applied to any cycling heating device.

Referring now to the drawing and more particularly to Fig. 1 there is shown an insulated electric oven including outer walls 20, inner metal walls 22 and insulation 24 between the inner and outer walls. At the bottom of the oven there is provided a lower oven heating unit 26 above which there is provided a baffle 28 to shield the major portion of the oven compartment 30 from the radiant heat of the element 26. The baffle 28 is so shaped as to provide convection currents to evenly distribute the heated air within the oven. In order to further increase the uniformity of temperature within the oven there is provided an upper heating unit 32 which, for baking purposes, supplies a small amount of heat in the top of the oven. This tends to balance, to a certain extent, the heat provided in the lower portion of the oven by the lower heating unit 26.

The upper heating unit 32 is also used for broiling purposes and for this purpose it is subjected to a higher voltage to increase its output. The heating units 26 and 32 are supplied from a three-wire Edison supply source including live outside conductors 34 and 36 and the neutral or ground conductor 38. The conductor 34 connects to a manual switch 40 which in turn is connected by the conductors 42 and 44 to one terminal of the lower heating unit 26 and by the conductors 42 and 46 to one terminal of the upper heating unit 32. The other live conductor 36 is connected to an oven thermostatic switch 48 of the hydraulic type which in turn is connected to a conductor 50 which connects to the other terminal of the lower heating unit 26.

The conductor 50 also connects to a contact 52 of a double-throw switch 54 having its one terminal connected by the conductor 56 to the second terminal of the upper heating unit 32. The switch 54 is also adapted to make contact with the contact 58 connected to the neutral conductor 38. When the switch 54 is moved to engage the contact 52, both heating elements 26 and 32 are energized at full voltage. This is used for rapidly preheating the oven. When the switch 54 makes contact with contact 58 the upper heating element 32 operates at about one-half voltage thus reducing its heat output to about one-fourth its maximum output at full voltage. In either of these circuit arrangements the supply of current to the lower and upper heating units is controlled by the thermostat 48.

The thermostat 48 includes a stationary contact 60, a movable contact 62, a lever 64, and an adjustable pivot 66 provided with an adjusting knob 68 for adjusting the temperature at which the thermostat is set to open and close. A light return spring 70 is provided for keeping the lever in engagement with the follower of the hydraulically operated actuating diaphragm 72 and with the adjustable pivot 66. A permanent magnet 74 is provided for attracting the adjacent end of the lever 64 to provide snap action. The thermostat 48 thus shown and described is merely diagrammatic and merely illustrates one form of oven thermostat to which my invention may be applied.

Normally the actuating diaphragm 72 is connected by a small capillary tube to a single comparatively large thermostatic actuating bulb which is located at some point within the oven which reflects the average temperature therein. In my control I provide a small capillary tube 76 which connects to a large thermostat bulb 78 which is located in the center portion of the rear wall of the oven compartment 30 where it reflects substantially the average temperature within the oven. It is shielded from direct influence of the lower heating element 26 by the baffle 28. The bulb, capillary tubing and the actuating diaphragm are filled with a suitable hydraulic actuating liquid which expands upon heating. Thus far construction of the thermostat and its actuating bulb is conventional.

However, according to my invention in order to reduce the differential of the thermostat, the bulb 78 has connected to it a second capillary tube 80 which connects to a second thermostat actuating bulb 82 which is substantially isolated from the major portion of the compartment 30 by its position beneath the baffle 28. This bulb 82 and the connecting tubing 80 are also filled with actuating liquid so that they form part of the same system. In this location, the bulb 82 is subjected to the direct influence of the heat generated in the heating element 26 when the element is energized. However, both bulbs 82 and 78 reflect substantially the average temperature within the oven when the heating elements have been deenergized for a short period of time, so that the closing of the thermostat is always substantially in accordance with the average temperature of the oven.

When the thermostat actuating bulbs 82 and 78 reach the switch closing temperature for which the thermostat 48 is set, the hydraulic fluid within the bulbs 82 and 78 will be contracted sufficiently to permit the spring 70 to close the contacts 60 and 62 with the aid of the permanent magnet 74. This will cause the energization normally of the lower heating element 26 at full voltage and the upper heating unit 32 at one-half voltage or less. Almost immediately the bulb 82 will be heated under substantially the direct influence of the lower heating element 26, while the bulb 78 will remain substantially under the influence of the average temperature within the oven compartment 30. The location of the bulb 82 with respect to the heating element 26 and the baffle 28 will determine the rise in temperature to which it is subjected upon energization of the heating element 26.

For the purpose of explanation, I have assumed that this rise in temperature of the bulb 82 is about 30 F. In order to provide a specific example I have assumed that the thermostat 48 has a normal differential of about 10° F. when used in the normal manner with a single bulb. Under the assumed conditions I provide a ratio of volumes between the bulb 78 and the bulb 82 so that the volume of the bulb 78 has four times the volume of the bulb 82. In order to further explain my invention I provide the following mathematical analysis for the above conditions:

$X$ = expansion per degree F. per unit bulb volume

Assume total bulb volume 5 units

Assume switch differential 10° F.

Expansion required to operate switch = $5(10x) = 50x$

If one unit bulb volume is heated 30° at the beginning of the heating cycle and four units of bulb volume are subject to average temperature of the oven, then the one unit will provide an expansion of $1(30x) = 30x$.

The remaining expansion required to operate the switch will be $50x - 30x = 20x$.

It is necessary for the four units of bulb volume subject to the average temperature to supply this remaining expansion and the temperature rise required will be $$\frac{20x}{4x} = 5° \text{ F.}$$

Thus it will be seen under these particular conditions, although the thermostat 48 would normally have a temperature differential of 10° F., that by the use of the two bulbs as described, the average differential is reduced to 5° F. Obviously if the thermostat normally would have a greater temperature differential, such as 25° F., it would be necessary to provide either a larger temperature rise of the small bulb or to provide the small bulb with a proportionately greater volume, or both, in order to reduce the average temperature differential to 5° or 10° F. Thus it will be seen that the proportioning of the bulbs and the temperature rise of the heated bulb can be proportioned in order to change the differential substantially as desired. While I have shown the invention as applied to the hydraulic form of thermostat which is commonly used to control electric ovens it should be understood that other types of thermostats having similar characteristics may also be used. For example, the bulbs may be charged with activated charcoal and carbondioxide, or some form of bimetal thermostat with a heated auxiliary might be used.

Referring now to Fig. 2, there is shown a single unit insulated electric oven compartment 122 provided with a single lower electric heating element 124 which is normally covered by a baffle 128 to shield the major portion of the oven from the radiant heat of the heating element to make as uniform as possible the temperatures within the compartment 122. This heating element 124 is connected to the supply conductors 134 and 136 under the control of the thermostat 148 which is like the thermostat 48 of Fig. 1. The thermostat 148 has a hydraulic diaphragm actuating means 172 connected by a capillary tube 176 to a single thermostat bulb 178. Preferably this entire connecting system is filled with a suitable thermally expansible liquid.

Instead of being subject entirely to the average temperature within the oven 122 when the unit 124 is energized, this bulb 178 has its lower portion 182 extending down beneath the baffle 128 so that this portion is subject substantially to the direct influence of the heating element 124 when it is energized. Thus, this provides a system substantially like that shown in Fig. 1, since about one-fifth of the bulb 178 is subject to the influence of the heating element 124 while the remainder is subject substantially to the average temperature in the oven compartment 172. Thus this one-fifth portion is subject substantially to a certain rise in temperature, for example 30° F., due to its relation with the heating element 124 for reducing the overall or average differential of the thermostatic control system. As in the first embodiment the entire portion of the bulb is subject to the average temperature of the oven compartment 122 when the thermostat 148 is open.

It will therefore be seen that a single bulb properly positioned will operate in the same way as the two bulbs shown in Fig. 1, and will reduce the temperature differential in the same manner, since the portion beneath the baffle will act substantially like the small bulb 82 while the portion of the bulb 178 above the baffle will act like the bulb 78. Thus I have disclosed a system which reduces the normal temperature differential of the thermostats 48 and 148 without materially increasing the cost or the number of parts of the control system where a bulb like bulb 178 is used. There is no material increase in cost because the cost of the additional bulb 82, such as is shown in Fig. 1, is comparatively small.

While the form of embodiment of the invention as herein disclosed, constitutes a preferred form, it is to be understood that other forms might be adopted, all coming within the scope of the claims which follow.

What is claimed is as follows:

1. In combination, an oven, electric heating means for said oven, a cyclically operable switch means having an inherent differential for energizing and deenergizing said electric heating means, and thermostatic actuating means for operating said switch means, said thermostatic actuating means including means for reducing the differential of cycling below the inherent differential of the switch means, said thermostatic actuating means including a container having a movable wall portion operatively connected to said switch means and a bulb means connected to the container, said bulb means and container being filled with a hydraulic actuating liquid, said bulb means including one bulb portion so located as to be subject as closely as practicable to the average temperature within the oven and a second bulb portion located so close to the heating means that it will be heated upon energization of the heating means substantially above the average temperature of the oven for providing a greater expansion of the liquid in the bulb means during the energizing of the heating means than could be provided if the bulb means were entirely responsive to the average temperature of the oven for reducing the differential of cycling.

2. In combination, an oven, heating means for said oven, and cyclically operable control means for rendering said heating means effective and ineffective in response to variations in temperature in said oven, said control means including a movable element and thermostatic actuating means therefor adapted to effect movement of said movable element and having two connected thermostatic bulb portions, one of said portions being so located that it is subject to the average temperature in the oven, and the other of said portions being located so as to be subject to direct radiant heat from said heating means and so close thereto as to be heated substantially above the average temperature in the oven when said heating means is rendered effective, whereby when said heating means is rendered effective a smaller differential of cycling will result than if both said portions were responsive to the average temperature in the oven.

3. In combination, an oven, heating means for said oven, and cyclically operable control means for rendering said heating means effective and ineffective in response to variations in temperature in said oven, said control means including a movable element and thermostatic actuating means therefor adapted to effect movement of said movable element and having two connected thermostatic bulb portions, one of said portions being so located that it is subject to the average temperature in the oven, and the other of said portions being located in good heat transfer relation to said heating means so as to be heated substantially above the average temperature in the oven when said heating means is rendered effective, whereby when said heating means is rendered effective said other portion will facilitate and hasten the subsequent actuation of said movable element by said one portion and thus a smaller differential of cycling will result than if both said portions were responsive to the average temperature in the oven.

4. In combination, an oven, heating means for said oven, baffle means for shielding the major portion of the oven from at least a portion of the heating means, and cycling control means for cycling said heating means including thermostatic fluid containing actuating means having means for reducing the differential of cycling including a bulb portion exposed directly to the radiant heat produced by the heating means and subject to temperature conditions adjacent the shielded heating means, said actuating means having a bulb portion shielded from the heating means and responsive to the atmosphere within the major portion of the oven, said actuating means being filled with a hydraulic actuating liquid.

5. In combination, an oven, a heating means in the lower portion of the oven, baffle means over said heating means, and cycling control means for cycling said heating means including a thermostatic actuating diaphragm and bulb means with means for reducing the differential of cycling including a portion of the bulb means located beneath said baffle means, and exposed to the direct radiation of the heating means, and a second portion of the bulb means located above the baffle means and shielded from the direct radiation of the heating means by the baffle means, said bulb means being filled with a hydraulic actuating liquid.

6. In combination, an oven, a heating means for said oven, baffle means for shielding the major portion of the oven from at least a portion of the heating means, and cycling control means for cycling said heating means including thermostatic actuating means having an actuating diaphragm and having a bulb portion subject to the average temperature within the oven and a means for reducing the differential of cycling including a second bulb portion subject to temperature conditions adjacent that portion of the heating means partially isolated by the baffle means, said actuating means being filled with a hydraulic actuating liquid.

7. In combination, an oven, electric heating means for said oven, baffle means for shielding the major portion of the oven from at least a portion of the heating means, a cyclically operable switch means having an inherent differential for energizing and deenergizing said electric heating means, and thermostatic actuating means for operating said switch means, said thermostatic actuating means including means for reducing the differential of cycling below the inherent differential of the switch means, said thermostatic actuating means including a container having a movable wall portion operatively connected to the switch means and a bulb means connected to the container, said bulb means and container being filled with a hydraulic actuating liquid, said bulb means including a bulb portion located on one side of the baffle means and exposed to and responsive to the atmosphere in the major portion of the oven and a second bulb portion located on the other side of the baffle means adjacent to the electric heating means and exposed to the direct radiation of the electric heating means for providing a greater expansion of the liquid in the bulb means during the energizing of the heating means than could be provided if the bulb means were entirely responsive to the atmosphere in the major portion of the oven for reducing the differential of cycling.

GEORGE C. PEARCE.